United States Patent [19]

Tanaka et al.

[11] Patent Number: 4,887,806
[45] Date of Patent: Dec. 19, 1989

[54] PAPER TRANSPORT SYSTEM FOR APPARATUS INCLUDING FACSMILE AND PHOTOCOPYING MACHINES

[75] Inventors: Hironori Tanaka; Hiroshi Shirakoshi, both of Nara, Japan

[73] Assignee: Sharp Kabushiki Kaisha, Osaka, Japan

[21] Appl. No.: 159,106

[22] Filed: Feb. 23, 1988

[30] Foreign Application Priority Data

Feb. 23, 1987 [JP] Japan .................................. 62-25946

[51] Int. Cl.⁴ ......................... B65H 3/52; B65H 1/06
[52] U.S. Cl. ..................................... 271/121; 271/165; 271/167
[58] Field of Search ............... 271/109, 113, 121, 123, 271/124, 165, 167, 126, 125, 275, 122

[56] References Cited

U.S. PATENT DOCUMENTS

| | | | |
|---|---|---|---|
| 4,015,839 | 4/1977 | McKee | 271/165 X |
| 4,457,507 | 7/1984 | Ishikawa et al. | 271/121 |
| 4,568,074 | 2/1986 | Murayoshi | 271/167 X |
| 4,674,737 | 6/1987 | Murayoshi | 271/124 |

FOREIGN PATENT DOCUMENTS

| | | | |
|---|---|---|---|
| 2588538 | 10/1985 | France. | |
| 0180540 | 11/1982 | Japan | 271/167 |
| 0113048 | 7/1983 | Japan | 271/124 |
| 0097138 | 5/1985 | Japan | 271/165 |
| 0178136 | 9/1985 | Japan | 271/121 |
| 0244734 | 12/1985 | Japan | 271/121 |

*Primary Examiner*—Kevin P. Shaver
*Assistant Examiner*—Edward S. Ammeen
*Attorney, Agent, or Firm*—Birch, Stewart, Kolasch & Birch

[57] ABSTRACT

A paper transport system for supplying papers such as manuscripts separately one by one along a paper transport passage through the gap between a paper feed roller and a separation rubber plate pressed by a separation leaf spring against the paper feed roller. When no papers are set, a pair of relatively shorter paper feed leaf springs on either side of the separation plate and leaf spring contacts the paper feed roller upstream of the paper transport passage forward of a contact line between the rubber separation plate and the paper feed roller.

6 Claims, 1 Drawing Sheet

PAPER TRANSPORT SYSTEM FOR APPARATUS INCLUDING FACSMILE AND PHOTOCOPYING MACHINES

BACKGROUND OF THE INVENTION

The present invention relates to a paper transport system for a facsimile, a copying machine, an optical character reading equipment, etc. for use in supplying papers with information thereon or documents for reproduction separately one by one to a reading or reproducing block.

Conventional paper transport systems are complicated in construction and lack compactness in size.

SUMMARY OF THE INVENTION

The object of the present invention is to provide a paper transport system in which a paper feed spring is positioned relatively further in the upper stream of the paper flow path than a separation rubber plate so that a forwarding roller and a leaf spring for pressing papers against the forwarding rollers are not necessary any more, thereby realizing size and cost reduction.

To achieve the above object, a paper transport system of the present invention, which supplies papers such as manuscripts separately one by one along a paper transport passage through the gap between a paper feed roller and a separation rubber plate pressed by a leaf spring against the paper feed roller, is characterized in that the leaf spring is made to be in contact with the paper feed roller at a line in the upper stream of the paper transport passage than forward of the contact line between the separation rubber plate and the paper feed roller when there is no stack of papers on the hopper of the system.

In the paper transport system of the present invention, papers such as manuscripts are forwarded one by one from a stack of papers set on the hopper by a rotating paper feed roller which provides the forwarding force as the stack of papers is pressed by a paper feed spring against the paper feed roller. Then a separation rubber plate pressed against the paper feed roller by a separation spring which is integral with the paper feed spring permits papers to be separated from one another and be supplied one by one sheet onto a paper transport passage comprising paper guide plates. Each paper thus supplied is transmitted to an optical reading device and then discharged.

As understood from the above, since the paper transport system of the present invention does not involve a forwarding roller and a leaf spring for pressing papers against the forwarding roller, it is possible to realize a compact, lower cost paper transport system.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

A preferred embodiment of the present invention is described in detail below with reference to the accompanying drawings.

Figure 1:
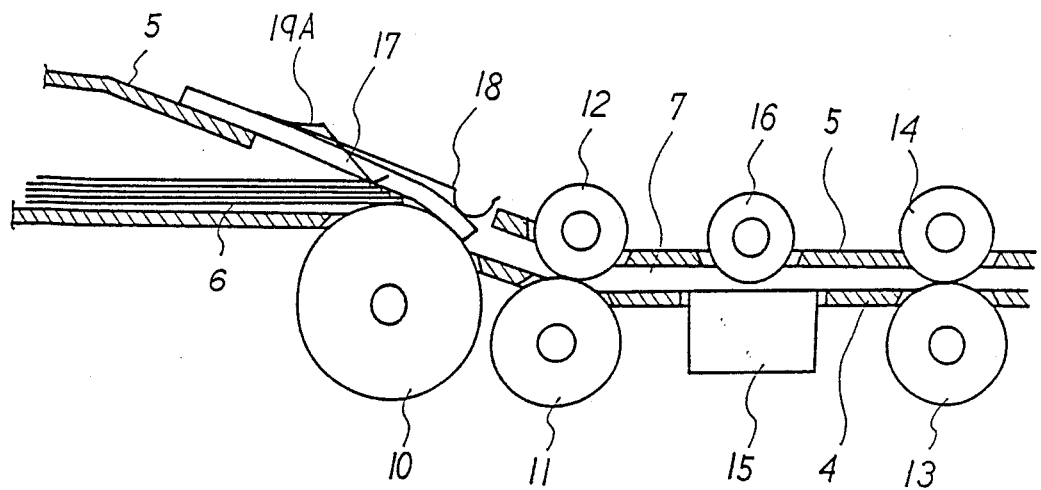
FIG. 1 is a vertical sectional view of an embodiment of the paper transport system of the present invention.

Referring to FIG. 1, a paper transport passage 7 along which to guide papers such as manuscripts are guided comprises a lower paper guide plate 4 and an upper paper guide plate 5. Along the paper traveling direction of the paper transport passage 7 are arranged a paper feed roller 10, paper feed springs 19A which press papers 6 against the paper feed roller 10, a first transport roller 11, a first pinch roller 12 made in pressure contact with the first transport roller 11 by the force of a leaf spring (not shown), a second transport roller 13, and a second pinch roller 14 made in pressure contact with the second transport roller 13 by a force of a leaf spring (not shown). Between the first and second transport rollers 11 and 13 are positioned a contact type image sensor 15 for reading information on each paper 6 and a pressure roller 16 for pressing the paper 6 against the image sensor 15.

Figure 2:
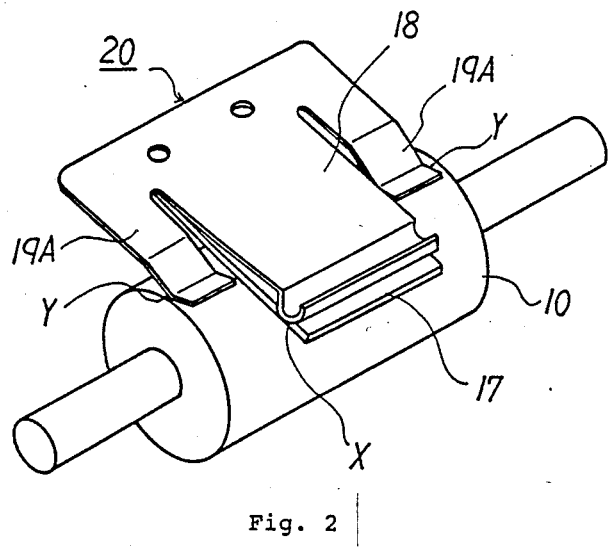
FIG. 2 is a perspective view of the essential part of the paper transport system of the present invention.

A separation rubber plate 17 of a high wear resistance is mounted in the upper part of the paper feed roller 10 with one end fixed on the upper paper guide plate 5 and with the other end kept in contact with the paper feed roller 10, allowing papers 6 to be separated from one another and be forwarded one by one. A leaf spring 20 is overlaid on the upper side of the separation rubber plate 17. The leaf spring 20 has slits to form a separation spring 18 in the center and a pair of the paper feed springs 19A each on both sides of the separation spring 18 as shown in FIG. 2. The separation spring 18 is bent to provide a specified spring pressure under which to press the separation rubber plate 17 against the paper feed roller 10. The paper feed springs 19A are also bent to provide such a spring pressure as to allow papers 6 to be transmitted smoothly by the paper feed roller 10.

The paper feed springs 19A are positioned so that they are made to come in contact with the paper feed roller 10 at a line Y in the upper stream of the paper flow path forward of the contact line X between the separation rubber plate 17 and the paper feed roller 10 when there is no stack of papers set on the system as illustrated in FIG. 2.

Since the paper feed springs 19A press papers 6 against the paper feed roller 10, causing the paper feed roller 10 to provide the forwarding force, it is not necessary to mount a forwarding roller and a leaf spring for pressing papers against the forwarding roller. Therefore, it is possible to make the paper transport system compact and low in production cost.

According to the present invention, as described above, the paper transport system, which forwards papers such as manuscripts separately one by one along a paper transport passage through the gap between a paper feed roller and a separation rubber plate pressed by a leaf spring against the paper feed roller, is characterized in that, when no papers are set, the contact line between the leaf springs and the paper feed roller is positioned in the upper stream of the paper transport passage prior to contact line between the separation rubber plate and the paper feed roller. Since the forwarding force is provided by the paper feed roller as the stack of papers is pressed by the paper feed springs against the paper feed roller, the paper transport system of the present invention does not require a forwarding roller and a leaf spring for pressing papers against the forwrding roller, resulting in a more compact and lower cost system.

While only certain embodiments of the present invention have been described, it will be apparent to those skilled in the art that various changes and modifications may be made therein without departing from the spirit and scope of the present invention as claimed.

What is claimed is:

1. A paper transport system including a facsimile machine and copying machine, having a paper transport passage, comprising:
    a paper feed roller located at the upstream end of said transport passage;
    a resilient, flexible separation plate located adjacent said paper feed roller and having a distal end portion contactable with said feed roller;
    a separation spring biasing said end portion of said separation plate against said feed roller;
    a pair of paper feed springs located on either side of said separation plate and said separation spring and having respective distal end portions contactable with said feed roller upstream of a contact line between said separation plate and said feed roller; and
    a paper guide plate located upstream of said paper feed roller adjacent a paper supply and wherein said pair of paper feed springs and said separation spring comprise integral portions of a common spring leaf member attached to said guide plate.

2. The system of claim 1 wherein said pair of paper feed springs are of relatively shorter length than said separation spring.

3. The system of claim 2 wherein said separation plate is also attached to said guide plate and located beneath the separation spring of said common spring leaf member.

4. The system of claim 3 wherein said pair of paper feed springs and said separation spring include upturned distal end segments.

5. The system of claim 4 wherein said paper feed springs include downturned intermediate length segments terminating in said upturned end segments.

6. The system of claim 3 wherein said separation plate comprises a rubber separation plate.

* * * * *